Nov. 29, 1932.   C. H. BLEDSOE   1,889,014
AUTOMATIC AIR HAND BRAKE
Filed Nov. 20, 1930   2 Sheets-Sheet 2
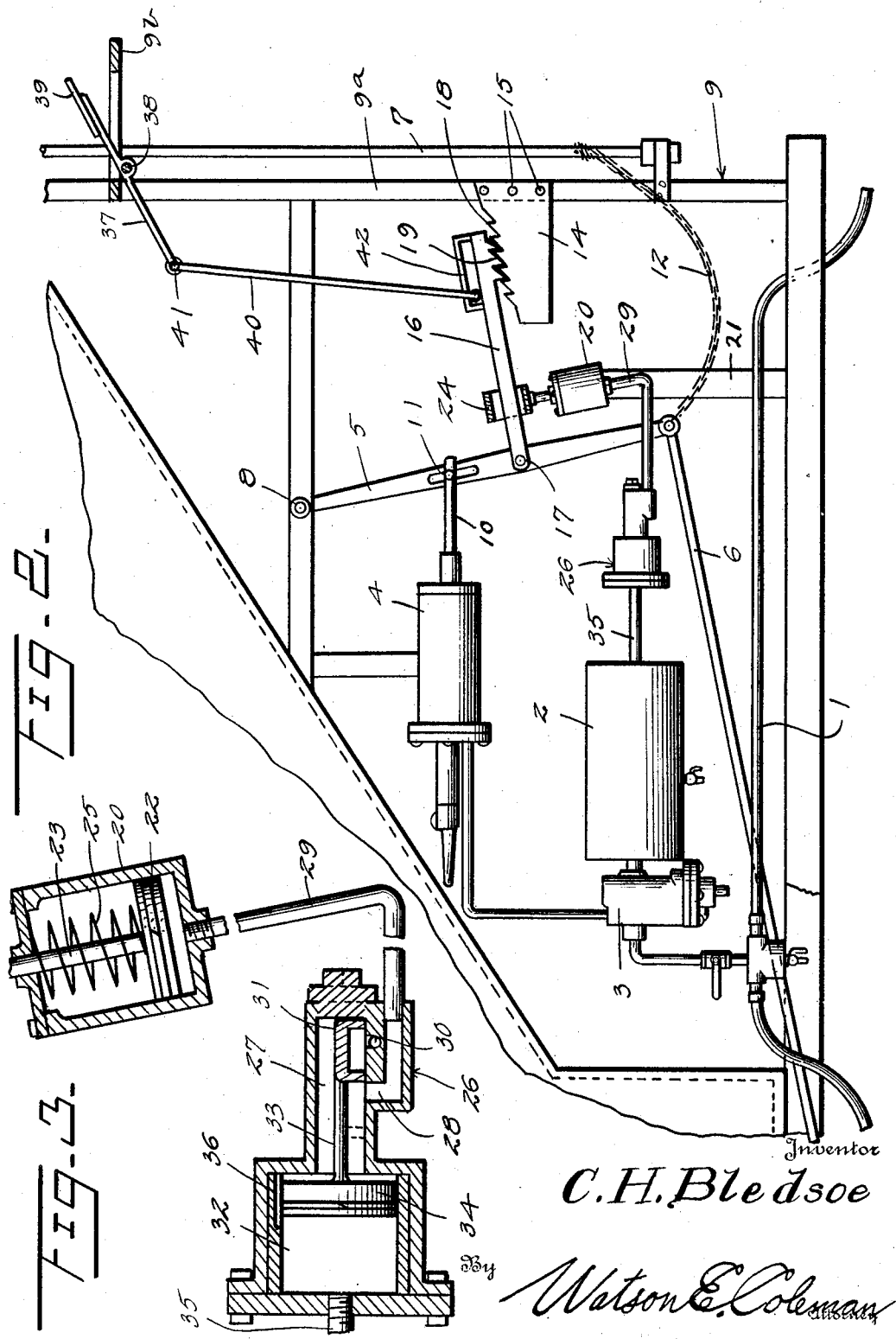
Inventor
C. H. Bledsoe
By Watson E. Coleman Patented Nov. 29, 1932

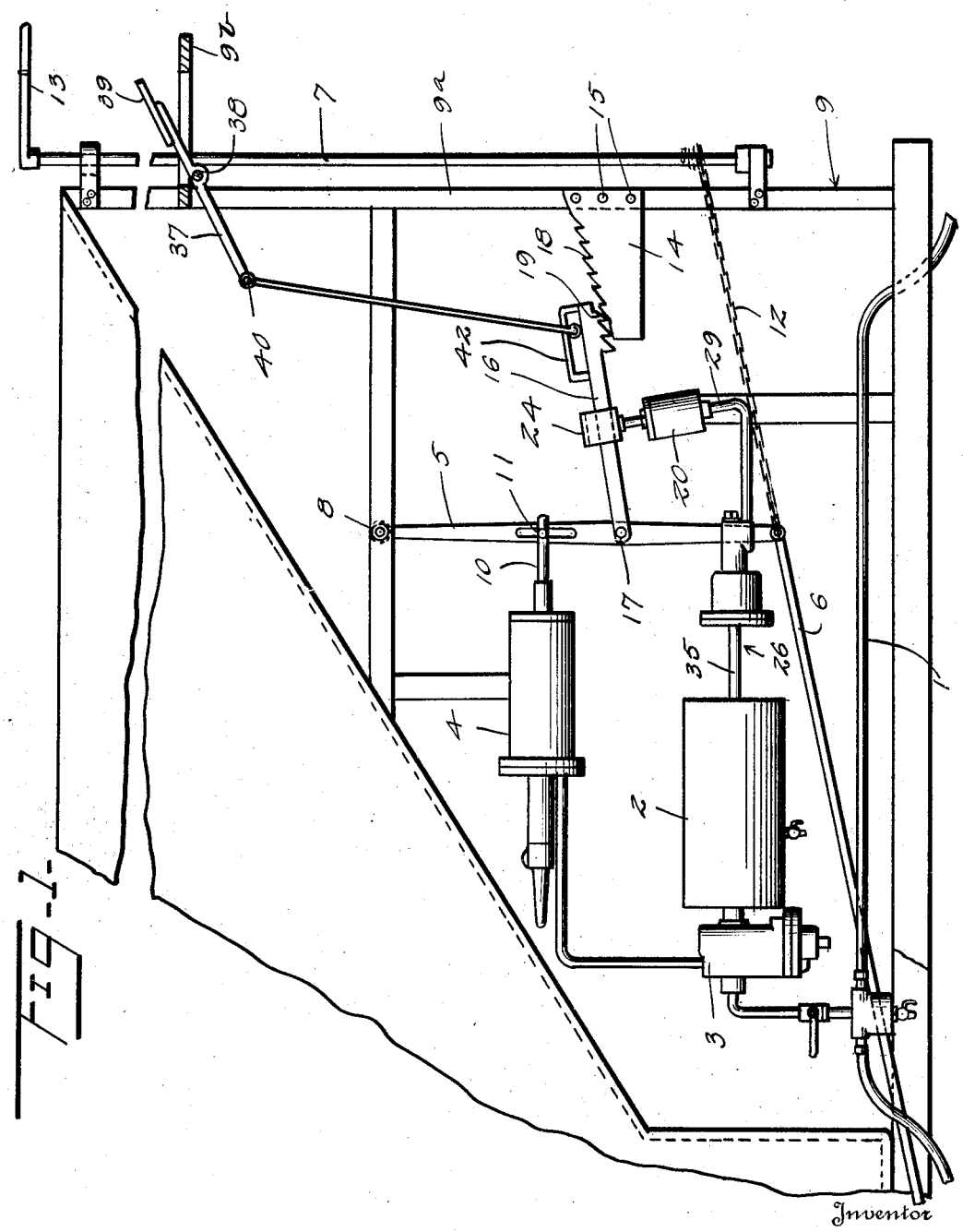

1,889,014

UNITED STATES PATENT OFFICE

CALVIN H. BLEDSOE, OF HAZARD, KENTUCKY, ASSIGNOR OF TWENTY-FIVE PER CENT TO GRACE WILLIAMS AND TWENTY-FOUR PER CENT TO FRED WILLIAMS, BOTH OF HAZARD, KENTUCKY

AUTOMATIC AIR-HAND BRAKE

Application filed November 20, 1930. Serial No. 497,014.

This invention relates to air brakes for freight and other railroad cars, and has for one of its objects to improve these brakes in a manner to render the use of air retainer valves unnecessary, to permit their safe application under all conditions, and to permit them to be held applied without the operation of their hand staffs.

To attain the foregoing and other objects, the nature of which will appear as the description proceeds, the invention comprehends the equipping of brakes of the character stated with means having the function of the pawls and ratchets of the hand staffs of these brakes and automatically operable during the application of the brakes to hold them applied.

The invention further comprehends the provision of means of the character stated which shall embody keepers fixed to the cars and bolts connected to the cylinder levers of the brakes and adapted during the application of the brakes to be engaged with the keepers so as to hold the brakes applied.

The invention further comprehends the provision of means operable by the action of the engineer or by the action of the brakeman for the purpose of disengaging the bolts from the keepers so as to permit the application of the brakes.

The invention is hereinafter more fully described and claimed, and illustrated in the accompanying drawings, wherein:

Figure 1 is a view partly diagrammatic illustrating the application of the invention to the combined air and hand brake of a hopper car, the brake being shown released.

Figure 2 is a similar view illustrating the brake applied, and

Figure 3 is a sectional view of the bolt retracting means.

Referring in detail to the drawings, 1 designates the train line, 2 the auxiliary reservoir, 3 the triple valve, 4 the brake cylinder, 5 the cylinder lever, 6 the brake rod and 7 the staff of a combined air and hand brake for a railroad car of the hopper type. The cylinder lever 5 is pivotally connected at one end, as at 8, to the car 9. The push rod 10 of the brake cylinder 4 is connected, as at 11, to an intermediate point of the cylinder lever 5, and the brake rod 6 and a chain 12 are connected to the free end of the cylinder lever. The chain 12 is connected to the staff 7 so as to permit the hand application of the brakes, and the staff is provided with a hand lever 13 through the medium of which it is turned to effect this application of the brakes. As these parts are of well-known construction further description and illustration of the same are deemed unnecessary.

In accordance with my invention, means is provided for releasably holding the brakes applied whether the application thereof is effected by the action of the engineer or brakeman, and this means comprises a keeper 14 fixedly secured, as at 15, to the upright brace 9a of the car 9, and a bolt 16 pivotally connected, as at 17, to the cylinder lever 5. The keeper 14 extends from its point of connection to the car in the direction of the cylinder lever 5, and is provided at its upper side with ratchet teeth 18 which incline upwardly in the direction of the attached end of the keeper. The bolt 16 extends from the cylinder lever 5 in the direction of the keeper 14, and is provided at the under side of its free end portion with ratchet teeth 19 for engagement with the ratchet teeth 18 of the keeper. When the brake is released, the free end of the bolt 16 rests upon the free end of the keeper 14 with teeth of these parts out of engagement with each other, as shown in Figure 1. During the application of the brake, the cylinder lever 5 moves in the direction of the keeper 14 and moves the bolt 16 in the direction of the attached end of the keeper, with the result that the teeth 19 on the bolt are engaged with the teeth 18 on the keeper, as shown in Figure 2. When the bolt 16 is thus engaged with the keeper 14, the brake will be held applied, and to permit the brake to be released, means is provided to permit the bolt to be disengaged from the keeper by the action of the engineer, and means is also provided to permit the bolt to be disengaged from the keeper by the action of the brakeman.

The first of these means comprises a cylinder 20 which is supported by a standard 21 from the center sill of the car 9 directly below the bolt 16, a piston 22 mounted in the cylinder and provided with a rod 23 extending through the head of the cylinder, and a yoke 24 secured to the upper end of the piston rod and through which the bolt slidably passes. A spring 25 is arranged in the cylinder 20 between the head of the latter and the piston 22, and tends to constantly urge the piston downwardly. The piston 22 is adapted to be moved upwardly against the tension of the spring 25 by air supplied to the cylinder from the auxiliary reservoir 2. The admission of air to and its escape from the cylinder 20 is under the control of a dual valve 26. This valve comprises a valve chamber 27 having a port 28 which communicates with the bottom of the cylinder 20 by way of a pipe 29, and a port 30 which communicates with the atmosphere. A valve 31 is slidably mounted in the chamber 27 for movement into exhaust position, in which position thereof it cuts off communication between the chamber and the port 28 and establishes communication between this port and the port 30, and for movement into supply position, in which position thereof it cuts off communication between the ports 28 and 30 and establishes communication between the chamber 27 and port 28. The valve 26 also comprises a piston chamber 32, the rod 33 of the piston 34 in this chamber being connected to the valve 31.

A pipe 35 extends from the auxiliary reservoir 2 to the piston chamber 32 and conveys air from the auxiliary reservoir to the piston chamber when the pressure of the air in the former is built up to more than fifty pounds. The air flows into the piston chamber 32 and moves the piston 34 in a direction to carry the valve 31 into supply position. When the valve 31 is in this position a leak groove 36 in the piston chamber 32 is uncovered, and air flows from this chamber into the valve chamber 27 and from the valve chamber into the cylinder 20, with the result that the piston is moved upwardly and carries the bolt 16 out of engagement with the keeper 14. This is done against the tension of the spring 25 which is powered to prevent upward movement of the piston 34 until after the pressure in the auxiliary reservoir 2 has been built up above fifty pounds. When the pressure in the auxiliary reservoir 2 falls below fifty pounds, which takes place during the application of the brakes, the spring 25 reacts and forces the piston 22 downwardly and the air below the piston 22 forces the piston 34 in a direction to carry the valve 31 into exhaust position. The bolt 16 is now free to engage the keeper 14 when the brakes are applied.

The means for permitting the bolt 16 to be moved out of engagement with the keeper 14 by the action of a brakeman, comprises a pedal lever 37 which is pivoted at a point intermediate its ends, as at 38, to the foot board 9b of the car. The upper end of the lever 37 extends through a slot in the foot board 9b and is provided with a pedal 39. The lower end of the lever 37 is connected to the bolt 16 by a rod 40 which is pivotally connected, as at 41, to the lever 37, and which is pivotally and slidable connected, as at 42, to the bolt 16.

When the brakeman wishes to retract the bolt 16 for engagement with the keeper 14 he bears downward on the pedal 39, which has its upper end located above the foot board 9b, in order to permit the operation thereof.

From the foregoing description, taken in connection with the accompanying drawings, it will be understood that the bolt 16 will be out of engagement with the keeper 14 when the brakes are released, that the bolt will move into engagement with the keeper during the application of the brakes, and that the engagement of the bolt with the keeper will hold the brake applied. The keeper 14 and bolt 16 are substituted for the pawl and ratchet now employed for the purpose of holding the hand staff 7 against rotation in brake releasing direction, and the keeper and bolt will perform the function of the pawl and ratchet. The keeper 14 and bolt 16 automatically function, that is to say, the bolt is engaged with the keeper without the operation of the hand staff 7, and in view thereof, the hand brake is in effect automatically set during the application of the air brake. As the hand brake is thus automatically set the car may be left on a siding without danger of its brakes being released due to leakage from the brake cylinder or other causes, and the auxiliary reservoir may be recharged while the car is descending a grade.

The bolt 16 may be retracted from engagement with the keeper 14 by the action of the engineer or by the action of the brakeman as in the matter hereinbefore pointed out.

While the invention is shown applied to the brake of a hopper car, it is to be understood that it may be applied to the brake of any car. It is also to be understood that the keeper 14 may be fastened to the end sill and that the cylinder 20 may also be supported from the sill if desired.

While I have described the principle of the invention, together with the structure which I now consider the preferred embodiment thereof, it is to be understood that the structure shown is merely illustrative and that such changes may be made, when desired, as fall within the scope of the invention as claimed.

What is claimed is:—

1. In a brake of the character set forth, a cylinder lever, a fixed keeper provided with upwardly directed teeth, a bolt pivoted at one end to the lever and having its free end resting upon the keeper, the free end of the bolt being provided with downwardly directed teeth adapted during the application of the brake to engage the teeth of the keeper to hold the brake applied, a loop carried by the bolt outwardly of its pivoted end, a pedal lever pivoted between its ends above the keeper, and a rod pivotally connected to one end of the lever and pivotally and slidably mounted in said loop, said pedal lever and rod providing means by which the bolt may be withdrawn from engagement with the keeper to effect the release of the brake.

2. In a brake of the character set forth, an auxiliary reservoir, a brake cylinder provided with a push rod, a cylinder lever connected to the push rod, a fixed keeper provided with upwardly directed teeth, a bolt pivoted at one end to the lever and having its free end resting upon the keeper, the free end of the bolt being provided with downwardly directed teeth adapted during the application of the brake to engage the teeth of the keeper to hold the brake applied and also provided with an elongated loop, bolt releasing means engaging in said loop, a cylinder located below the bolt, a piston reciprocable in said second cylinder and having a rod extending upwardly through the cylinder, a yoke fixed to the upper end of the piston rod and slidably receiving the bolt, a spring constantly urging the piston downwardly so that the bolt may occupy an active position with relation to the keeper, and means for admitting air from the auxiliary reservoir to said second cylinder below the piston therein when the pressure of the air in the auxiliary reservoir is greater than the power of the spring.

3. In a brake of the character set forth, an auxiliary reservoir, a brake cylinder provided with a push rod, a cylinder lever connected to the push rod, a fixed keeper provided with upwardly directed teeth, a bolt pivoted at one end to the lever and having its free end resting upon the keeper, the free end of the bolt being provided with downwardly directed teeth adapted during the application of the brake to engage the teeth of the keeper to hold the brake applied, a cylinder located below the bolt, a piston reciprocable in said second cylinder and having a rod extending upwardly through the cylinder, a yoke fixed to the upper end of the piston rod and slidably receiving the bolt, a spring constantly urging the piston downwardly so that the bolt may occupy an active position with relation to the keeper, a valve chamber having a port communicating with said second cylinder below the piston therein and having an exhaust port communicating with the atmosphere, a valve slidably mounted in the chamber for movement into a position to establish communication between said ports and into a position to cut-off communication with said ports, a piston chamber communicating with the auxiliary reservoir and with the valve chamber and provided with a leak groove, and a piston in said second chamber and connected to the valve, said second piston being adapted to uncover said leakage groove and the valve being adapted to cut-off communication between said ports when the pressure of the air in the auxiliary reservoir is greater than the power of the spring to direct air to said second cylinder to raise the piston therein and thus move the dog into inoperative relation with the keeper, and said second piston being adapted to cover the leakage groove and the valve being adapted to establish communication between said ports when the pressure of the air in the auxiliary reservoir is less than the power of the spring to release the air from said second cylinder so that the dog may return to operative relation to the keeper.

In testimony whereof I hereunto affix my signature.

CALVIN H. BLEDSOE.